(12) United States Patent
Glombitzs et al.

(10) Patent No.: US 6,490,538 B1
(45) Date of Patent: Dec. 3, 2002

(54) PROCEDURE AND MEANS FOR CONFIGURING A MEASURING DEVICE

(75) Inventors: Ulrich Glombitzs, Gladbach (DE); Dino Simonits, Köln (DE)

(73) Assignee: LIOS Technology GmbH (DE)

( * ) Notice: Subject to any disclaimer, the term of this patent is extended or adjusted under 35 U.S.C. 154(b) by 0 days.

(21) Appl. No.: 09/506,858

(22) Filed: Feb. 17, 2000

(51) Int. Cl.$^7$ .............................................. G06F 19/00
(52) U.S. Cl. ........................ 702/123; 702/117; 702/122; 702/127
(58) Field of Search ................................ 702/123, 116, 702/117, 122, 130, 136, 127; 710/8–10, 15

(56) References Cited

U.S. PATENT DOCUMENTS

| | | | |
|---|---|---|---|
| 4,812,645 A | * 3/1989 | Griffiths | ..................... 250/277 |
| 5,765,948 A | 6/1998 | Sai | |
| 5,918,194 A | * 6/1999 | Banaska et al. | .............. 702/91 |

FOREIGN PATENT DOCUMENTS

| | | | |
|---|---|---|---|
| EP | 0450829 A1 | * 10/1991 | ........... G01P/15/08 |
| JP | 61270632 | 11/1986 | |
| JP | 08247858 | 9/1996 | |

\* cited by examiner

*Primary Examiner*—Bryan Bui
(74) *Attorney, Agent, or Firm*—Harness, Dickey & Pierce, P.L.C.

(57) ABSTRACT

With the proposed invention a method for configuring a measuring arrangement for physical, more particularly thermal conditions over a section to be measured is indicated, comprising at least one locally distributed sensor. The measuring arrangement consists of programmable modules with the minimum characteristics of acquire, edit, save, represent and signal measurement data of at least one distributed sensor. The method according to the invention consists in the fact that zone-specific data of the section to be measured are assigned to zone-specific measured quantities, and that these data are combined into data groups, and that the modules are configured with parameter sets with which editing steps of the individual modules are functionally assigned to one another. One parameter set preferably includes at least sensor-specific parameters; measuring instrument-specific parameters; organization of data and programs; organization of hardware modules; representation of the data and communication parameters.

19 Claims, 5 Drawing Sheets

US 6,490,538 B1

PROCEDURE AND MEANS FOR CONFIGURING A MEASURING DEVICE

FIELD OF THE INVENTION

The invention relates to a method for configuring a measuring arrangement for physical, more particularly thermal, measured quantities over a section to be measured, comprising a t least one locally distributed sensor. An associated arrangement is also claimed.

BACKGROUND OF THE INVENTION

Two main types of locally distributed measuring sensors are known, those that operate electrically and others that operate optically.

By the section to be measured is meant not only a linear but also two- or three-dimensional installations of a distributed sensor. Flat (e.g. meander-shaped) or spatial installations may also be involved here, for instance wrapping of a reactor vessel.

In recent years optical measuring instruments using Raman backscatter with at least one installed optical fibre have come on the market (DE 195 25 626 A1).

A different example of an optical fibre measuring instrument for pressure is to be found in DE 38 09 957 A1. A distributed optical fibre moisture sensor is described in DE 195 30 985 C 1.

The known measuring arrangements are very specifically tailored to certain applications.

SUMMARY OF THE INVENTION

The object of the invention is to indicate a method and a corresponding arrangement for configuring a measuring arrangement for physical measured quantities over a section to be measured, comprising at least one locally distributed sensor, so that the measuring arrangement can be individually adapted with great flexibility to the physical, local and chronological circumstances of a section to be measured. Also to be thereby achieved is all-round quality of monitoring, editing and/or reproduction of the measured values.

The measuring arrangement is to be used to acquire physical measured quantities over the section to be measured, such as temperature, pressure, tension, flexure and/or their changes over time. By locally distributed sensors are meant sensors which supply section information and physical data simultaneously.

The achievement of the object is to be found in the associated independent claims. Advantageous developments of the invention are claimed in the dependent claims.

DETAILED DESCRIPTION OF THE PREFERRED EMBODIMENTS

Figure 1:
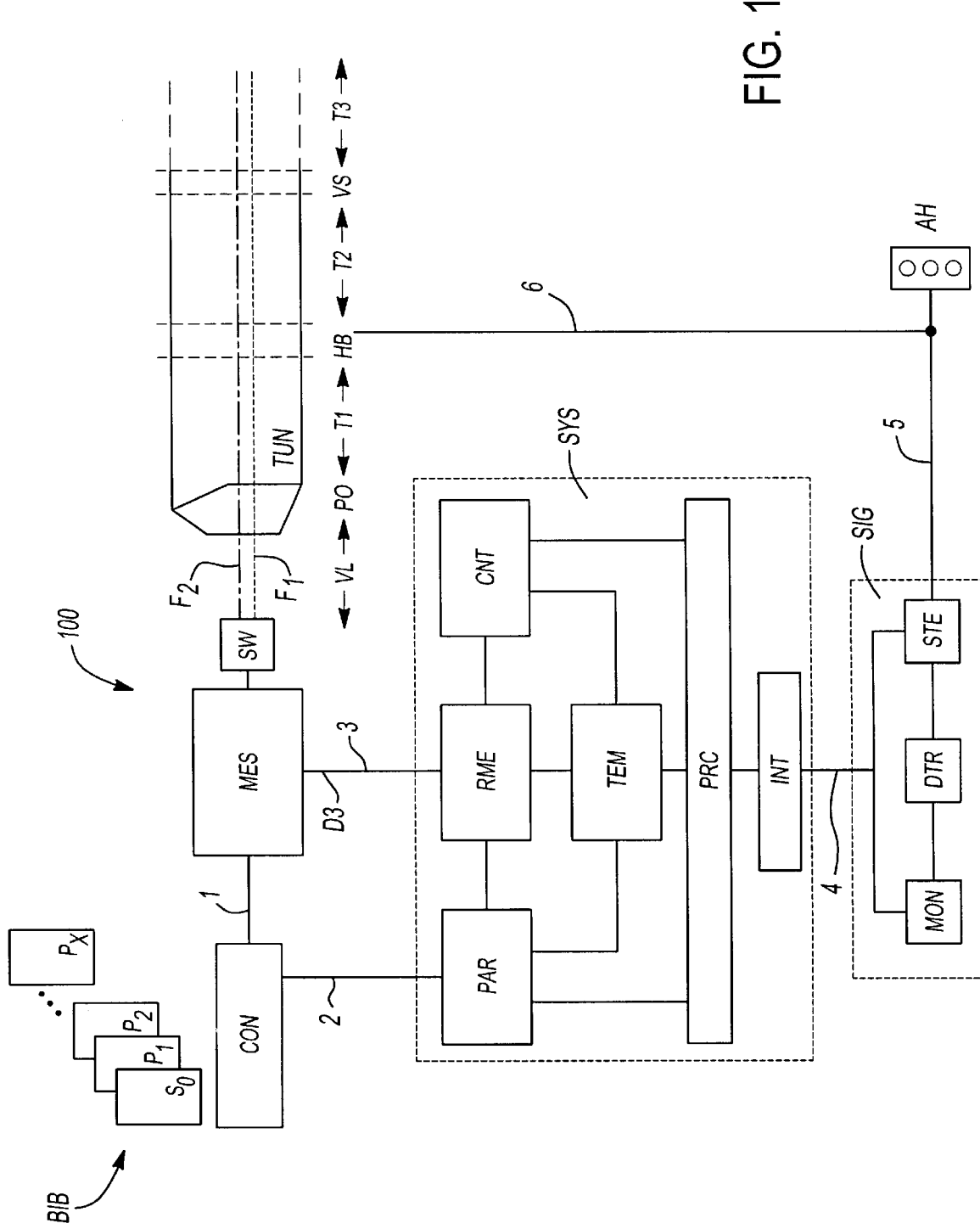
FIG. 1 shows a schematic representation of a measuring arrangement.

The essential parts of the measuring arrangement, as well as the sensors and the physical measuring instrument, are:

a data library with parameter sets which include at least: section to be measured-specific parameters (essentially location- and partial section data of the section to be measured); sets of configuration parameters (also called tools), sensor-specific parameters; measuring instrument-specific parameters; organisation of data and programs, organisation of hardware modules; representation and transmission of data (communication parameters), a device for configuring the programmable modules of the measuring arrangement with parameter sets retrievable from the data library, the modules of the measuring arrangement should at least be suitable for acquiring, editing, saving, representing and signaling measured quantities. By modules are not necessarily meant individual, physically separable modules, they may also be modules which are able to perform several tasks together.

The invention with respect to the method consists in the configuring of such a measuring arrangement which is so programmed that zone-specific data of the section to be measured are assigned to zone-specific measured quantities and these data are combined into data groups.

The two essential steps for configuring the measuring arrangement are: the zone-specific data of the section to be measured are retrieved from the data library and transmitted to the measuring arrangement and from the data library at least one parameter set for editing at least one previously defined data group is transmitted to the measuring arrangement.

The acquisition of the (usually analogue) measured quantities takes place in the physical measuring instrument. By editing is meant everything appertaining to the conversion, calculation and analysis of the measured quantities, the most important being the creation of a section-dependent measurement profile (also location profile) for one or more chronologically sequential measurements. The task 'save', 'represent' and 'signal' is performed by preferably electronic data processing modules known to the expert.

As well as the advantages already known from using distributed (more particularly fibre-optic) sensors, a number of advantages result, of which only some need be singled out: free choice of measurement points over the sensor length (zoning), low maintenance, simple checking of t he mode of operation, intelligent evaluation of measured quantities, reduction of error messages, detailed representation and analysis of the physical measured quantities or physical conditions and high speed.

Possible examples of applications of the invention are measuring arrangements which are adaptable by means of configuration to the greatest variety of applications without the need to make any change to the hardware. Such applications are measurements in tunnels, in cable or ventilation ducts, in supply or subway shafts, in conveyor systems, in silos, storage spaces or with chemical or other reactors.

By way of example, an optical system may be set up according to the invention as an OFDR system (e.g. according to DE 195 25 626 A1) with at least one installed optical fibre.

Mentioned as examples of locally distributed sensors are:

(1) optical sensors (U.S. Pat. No. 4,812,645, DE 195 25 626 A1, DE 93 18 404 U1, DE 38 09 957 A1, DE 195 30 985 C1). A contributory factor in the design and physical characteristic of an optical fibre sensor is essentially also its casing (plastic-coated, steel tubes, preferably stainless steel).

(2) Examples of electrical sensor systems are: endless thermocouple (the German company mawi-therm's prospectus, 1986) or in DD 9283 (3.3.1955) or a measuring chain composed of measurement resistors, see DE 41 27 646 or also in the essay entitled "Wasserwirtschaft" (WATER MANAGEMENT) 83 (1993), pages 206–208, 211–213. Distributed measurement resistors (for example PT100 resistors) or endless thermocouples are also referred to as locally 'quasi-distributed' sensors.

Depending on the type and connection of the sensor, it may be measurable both in the forward and in the reverse direction. When several sensors are used over a section to be measured, it is necessary to differentiate whether the sensors are joined at the end (via splicing) or not. Another (though complicated) measuring method may consist in coupling a measuring arrangement (redundant) to each end of a sensor. Both measuring arrangements may be configured and used independently of one another.

The component parts of parameter sets of the configuration files of the library are (see also table 1):

1. Sensor-specific (Section to be Measured-specific) Parameter Sets (Geometry and Installation)

These parameter sets are determined by the physical characteristic of the sensor, the local position of the sensor and the installation geometry and are also referred to as zone-specific parameter sets of the section to be measured. The parameter sets are essentially used to combine the zone-specific measurement data of the section to be measured into data groups (as explained under no. 4).

2. Measuring Instrument-specific Parameter Sets

These parameter sets are determined by the physics of the measurement technique (e.g. optical or electrical characteristics).

3. Organisation of the Software and Associated Hardware

These parameter sets are required to control and organise data, programs and electronic modules (memories, reproduction media etc).

4. Data Groupings

With these parameter sets individual measured quantities (measurement data consisting of physical and position information) are combined into data groups, the grouping being adapted to the freely selectable or predefined division into zones of the section to be measured. It results in assigning of position- or zone-specific data of the section to be measured to the actual measurement data.

5. Parameter Sets for Editing and Analysis (Editing Tools)

With these parameter sets are determined the tools with which the data or data groups are evaluated, analysed and edited, for instance with special arithmetical algorithms or transformations.

6. Representation of the Data (Representation Tools)

These parameter sets are used to represent the measurement data (in measurement data profiles) and/or to output them (visualisation, views, colour palettes, hardcopy, print etc.).

7. Communication Parameter Sets (Communication Tools)

With these parameter sets the protocols and addresses for the data transmission and trigger activities are defined.

The invention provides a fullest possible system configuration of the measuring arrangement. All the measurement parameters and all the parameters concerning the application with respect to organisation, geometric dimensions and groupings, (position or course, one- or multi-dimensional geometry, locations and zone sectors of the sensor), the analysis and event processing sets to be used, are filed in the parameter sets of the configuration files. Other contents of the parameter sets are, for example, data relating to the evaluation of the sensor over time and/or by zone, choice of local resolution (time cycles, measurement accuracies through statistical averaging methods), choice of the local sectors to be measured or zones, physical extreme values which should result in alarm, three-dimensional profiles of the measurement data, parameterizing (physics) of the sensor. In this way the library contains possible configurations which may be selected for the particular application. The system also allows parameter sets to be added to the library at any time.

If configuration is omitted through error or if dispensing with a specific configuration, a specific configuration file with standard values is used (either in the case of error or in the case where there has been no manual configuration). In the manual dialogue with the measuring arrangement via an interface, it is possible at any time also to load other configuration files from the library as a derivative from already existing entries for the configuration.

As far as the manufacturer of a measuring arrangement configurable according to the invention is concerned, the advantage follows that a measuring arrangement can be configured in a very detailed manner to the requirements of the customer. The customer has the advantage that, as well as the 'normal' configuration, he can also prepare other configurations which may be used as required for specific situations (repair work, modification measures, change of sensor).

An important function of the measuring arrangement is the divisibility of the sensor's section to be measured into optional zones (locally defined sectors of the sensor). Along with the division, the accuracy (local resolution), methods of analysis, alarm signalling criteria and other variables of the measurement can in each case also be freely selected individually and zone-specifically. Particular zone areas may be the sensor's approach section (from the measuring instrument to the actual section to be measured), normal zones (section sectors) or particularly crucial ones. There is also the option of assigning to each zone a zone title, the zone type that indicates to which events the alarm system is reacting, and also a set of analysis parameters that applies locally.

The local analysis parameter sets contain the local and time characteristics applying to each zone to trigger an alarm (event processing) via anomalies of the measured quantity, so that specific local data may be taken into account in the measured quantity analysis. Thus, for example, the strong influence of a possible diurnal variation of a measured quantity can be allowed for and may thereby minimize the incorrect alarm response. Furthermore, the local analysis parameters include arithmetical operations to be applied locally to the measured quantity distribution. Optional, generally defined tools (programs and/or arithmetical algorithms) may be included in the analysis and are used to edit the measured quantities if, for example, the sensor cannot be directly integrated in the installation to be monitored because of inaccessibility etc. A transformation from the acquired measured value (a measured temperature quantity lowered as a result of substantial heat insulation, for example) to the actual measured value is then effected by means of physical and also mathematical modelling.

With the start of the configuration, the selected configuration data are transmitted to all relevant modules of the measuring arrangement and it is programmed. The modules need not be individual hardware components, they can also be integrated as a whole in a computer. The essential modules are, in detail: the physical measuring instrument, the module for measured quantity analysis and the control unit for other connected modules. Electrical and/or optical transmission channels are used along with conventional transmission protocols which also allow long-distance data transmission for modules remote from the rest of the modules of the measuring arrangement. The supervision of the measurement sequence and function monitoring of the sensors take place on a monitor. If necessary, this monitor and the monitor of the module used for the configuring may also be one and the same.

By preference a particular method step is used for a defect situation, wherein checking of all components of the measuring instrument and particularly of the at least one sensor for a mechanical defect is done after the start or even during the operation of the measuring instrument, and on discovery of an operational malfunction or a defect, a current parameter set is changed or an additional parameter set is loaded which contains parameters allowing for an operational malfunction or mechanical defect. With regard to a defect of the sensor, function monitoring of the measuring arrangement and of the sensor or sensors may be implemented for this purpose with the aid of an editing step of the raw measured quantities (backscatter curves in the optical case). After determining the measured sensor end (a sensor shortened as a result of breakage, for example), it is established by comparison with the configured zone arrangements and using general plausibility rules in the measuring arrangement whether the sensor is damaged in its operation or is even destroyed. With the aid of the changed or the additional parameter set, malfunctions for all relevant zones are signalled and in addition the precise location of the malfunction is indicated. If the sensor has been installed in redundant form (parallel double sensor), the site of the malfunction can be bridged by reciprocal measuring via both sensors, if they are still intact. With the aforementioned parameter set, there is thus a fallback option for the configuring, so that, even when a sensor breakage is present, reliable measuring takes place without external intervention.

In use, following predetermined measurement cycles the measuring arrangement delivers a locally distributed measured quantity profile over the sensor section. When a measuring cycle is completed, measured quantity profiles are calculated from the raw measured quantities in an analysing unit module and saved. The measured value profiles are calculated from the available measured quantity curves with the parameter sets used in the configuration taken into account. The calculated local data characteristics are saved. They may be retrieved at any time and may also be linked with those from previous measurements. The gradually increasing amounts of measured values, which in the simplest case of a non-two-dimensional sensor arrangement may be represented as a three-dimensional location/time measured value distribution (see FIG. 3), provide the basis for detecting anomalies of the measured quantity (quantities).

By editing of the measured quantities is meant the analysis of the measured quantities and also the subsequent event processing. The measured quantities in the form of a three-dimensional location/time data distribution are checked in relation to the zone groupings with the aid of the locally applicable trigger criteria. As well as an extreme value locally adapted to the measured object, a staggered, individually adaptable differential characteristic may additionally be used for message or alarm triggering. Other types of trigger criteria are included in arithmetical algorithms or tools or may be added to the library. As the number of measurement cycles saved increases, the evaluation for anomalies becomes increasingly more precise as the metrological history of a zone is also taken into account. With the installation geometry of the sensor taken into consideration, the extent of anomaly of the measured quantities - for instance the extent of a temperature anomaly (seat of a fire)—is calculated on the basis of the measurement locations locally belonging together in one zone which satisfy a trigger criterion. As well as the extent, the direction of expansion may be an important variable in the special case (cf. damage-repair or fire-fighting). This is determined either by the variation from geometric centre of mass calculations or by measurement location selection used for the extent and by pattern comparison with characteristic measured quantity profiles.

The events emerging from the analysis (trigger criterion fulfilled in a specific zone, direction of expansion calculated or error occurred etc.) are converted in the measuring arrangement by way of the event processing whose individual steps may similarly be configured. With the selected configuration data, editing of arising events that relates to the application can be performed. The following may be defined as events each of which should be a trigger criterion: exceeding of a preselected measured quantity, a preselected measured quantity change over time positive or negative), deviation of a spatial data profile from a preselected profile, operational malfunction of the laser, operational malfunction as a result of power failure etc. The event processing achieves signalling (mapping) of each event to an address point, for instance the transmitting of a signal from the emergency power unit containing the message that the power supply from the main supply has been switched over to the emergency power unit. If an event has no address point assigned to it, the n signalling of this event may be suppressed or signalled to a collective address point. Signals signalled to address points may, along with the reason to change the configuration, be further processed in a great variety of ways: visual representation, acoustic signal, actuation of switches, valves, sprinklers etc.

The signals generated via the event processing are transmitted by means of an interface to coupled systems and/or associated address points. Incorporated in the measuring arrangement is a number of floating contacts. These may similarly be assigned by the configuration of the event processing to any address points. Integrated visualization software makes it possible for event representations or even application-specific data visualisations to be produced. Furthermore, process variables ("events") output by the measuring arrangement may be used to control other installations, such as management systems, or for transfer to remote locations by means of long-distance data transmission.

Another preferred method step consists in the fact that a specific, pre-saved parameter set is automatically used for the configuring and a previously used parameter set is overwritten when the measuring arrangement changes over to emergency power operation.

By preference at least a fibre-optic sensor should be used as sensor and a reflectometric measuring system (OTDR or OFDR system) as the measuring instrument. Thus the invention is also to be described in detail with the aid of an embodiment "A measuring arrangement (OFDR system) for temperature measurement and fire alarm signalling in a tunnel". Further explanations are provided with respect to a second embodiment A waste tip monitoring system. The following table and several figures are used for the description, in which in detail:

Table 1 shows component parts of configuration files of the library in the example of a fibre-optic temperature measurement.

The component parts of configuration files of the library are shown in seven groups in table 1 in the example of a fibre-optic temperature measurement.

Represented in FIG. 1 is an embodiment of a measuring arrangement (100) in which two optical fibre sensors are installed in a tunnel. Thermal measurement variables or conditions in the tunnel are to be monitored with the measuring arrangement and are to be used for fire alarm signalling.

The section to be measured comprising two sensors F1, F2 has several sectors: the approach VL in front of the tunnel entrance, the tunnel portal P0, three zones T1, T2, T3 in the tunnel TUN, a lay-by HB for cars, a supply shaft VS. By means of configuration the section to be measured can be divided up as a whole or in parts into sectors or zones. A configuration of this kind may be, for example: suppressed data reproduction in the approach VL; portal 1 comprising one zone; section Ti comprising twelve zones; lay-by comprising two zones; section T2 comprising ten zones; section T3 comprising ten zones; shaft VS comprising two zones; a further section comprising twelve zones; the exit portal comprising one zone and the fibre end (splice) one zone.

The physical (analogue) measured quantities of the sensors F1, F2 are acquired by the physical measuring instrument MES. A switch SW is intended to indicate that individual measurements via each sensor are possible. The measuring instrument may be an OFDR system, for example. An operator's module CON (usually comprising data entry terminal and monitor) serves for monitoring the measuring instrument and the configuration. The configuration files with the parameter sets $S_0$, $P_1$, $P_2$, . . . of the library BIB are selected via the operator's module and the relevant module is programmed. The interconnections of the modules (or corresponding data channels) are indicated by the lines 1, 2, to 6.

Figure 2:
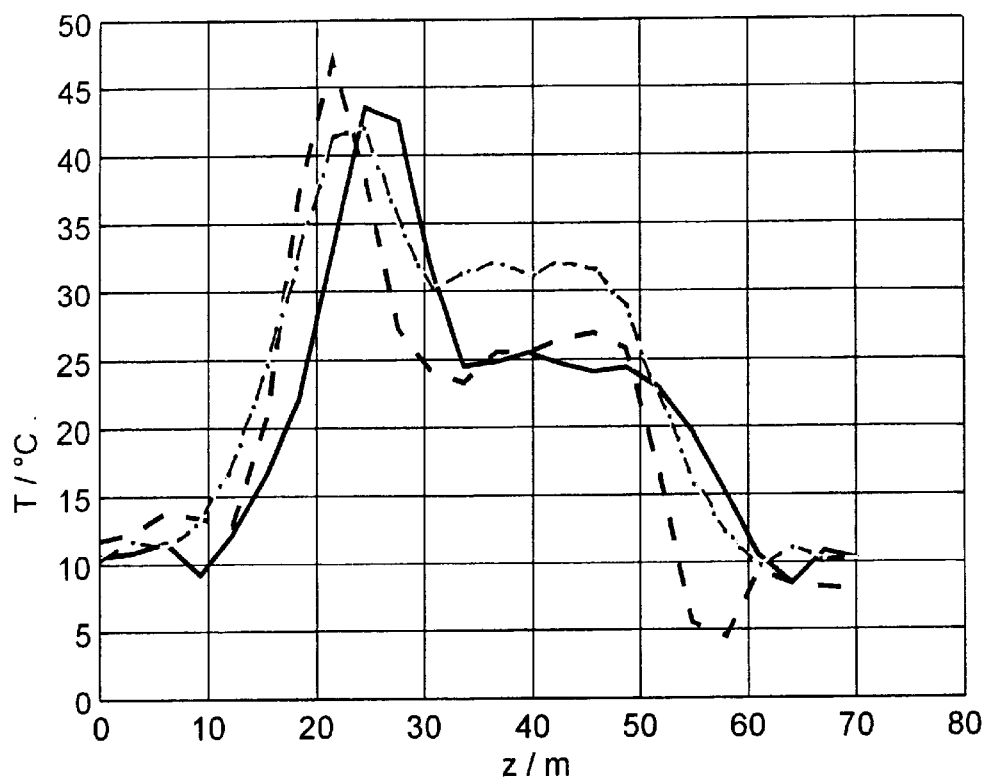
FIG. 2 shows three temperature profiles.
Figure 3:
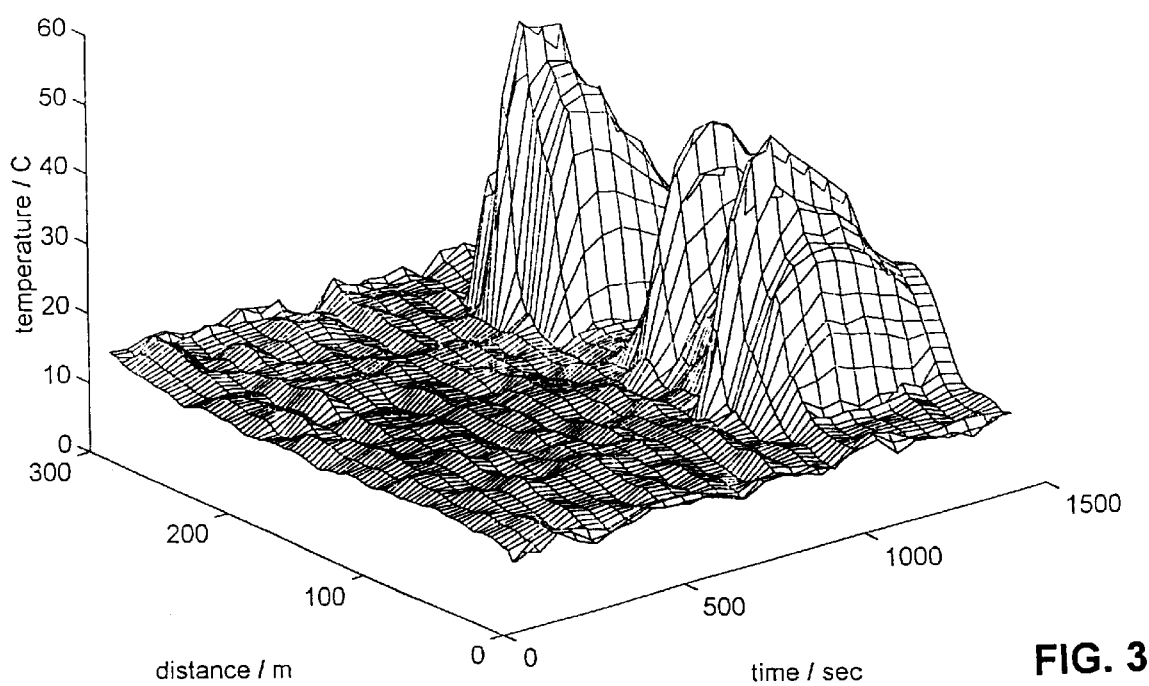
FIG. 3 shows temperature measurements set out over time.
Figure 5:
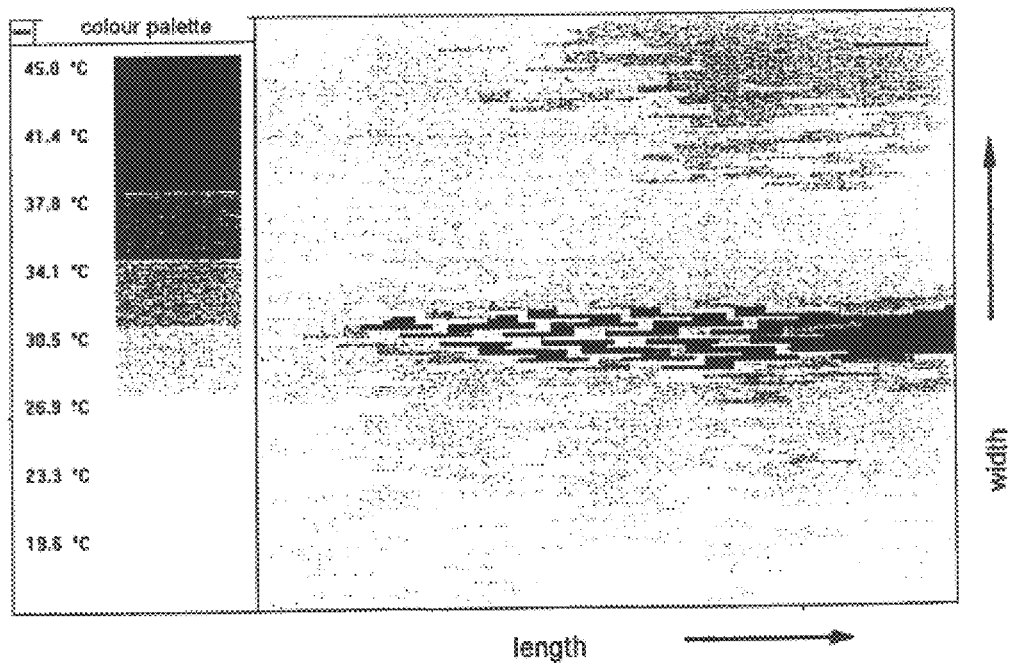
FIG. 5 shows a flat pattern of a measurement.

The (digital) raw measurement data D3 delivered by the measuring instrument MES run via line 3 to the collecting or memory module RME. A module CNT serves for function monitoring of all other modules. The sensor or sensors or the measuring instrument are preferably checked for ability to function. The most important measure involves the checking for sensor breakage. The module PAR is essentially the unit that saves and/or organises the configuration data. The raw measurement data D3 are converted in the module TEM into local and/or chronological measurement profiles. Typical measurement profiles are represented in FIG. 2, 3 and 5. The advantage of the configuration is revealed, for example, in the fact that the measured quantities for the zone of the sensor approach VL are obtained but are not further included in measurement profiles. This cuts out computing time and the evaluation process is accelerated.

The central module of the measuring arrangement is the processing unit PRC which is connected via an interface INT by the line 4 to the 'outside world'. The measured values are output via the line 4. The unit PRC may also include saving and organisation of the data. Reached via the interface INT are, for example, a monitor MON, a modem DTR for data transmission and/or a control module STE. The modules MON, DTR, STE are combined electronically or as a microcomputer as a signalling or visualising unit SIG. Signals derived from the measured value editing (events or trigger signals) are transmitted by the control module STE via a line 5 to visual and/or acoustic indicating devices AM or to devices or actuators in the tunnel (via line 6), where valves or fire-fighting equipment, for example, may be operated.

Reproduced in FIG. 2 are three measured temperature profiles. The profiles differ in their maximum values, the ascending or descending flanks, the position of the centre of mass under the curves and their linear extent. With corresponding bandwidth, the maximum value, ascending or descending flanks, position of the centres of mass, linear extent are specified numerically in the configuration as a pattern store, so that the measured values can be compared with such patterns. With corresponding configuration the three temperature profiles of FIG. 2 would each point to a 'type of fire' characterised by the speed of the fire's development (ascending flank dT/dt). Underlying this is the fact that combustible chemicals (petrol, diesel fuel, plastics) each have a certain type of fire development (ascending flank). The message or alarm signals are linked with these data in the configuration so that it is possible in the alarm message to give an indication of a certain type of fire development (or of a chemical). It can be ascertained from the position of the centre of mass whether the fire is developing symmetrically around a location or whether shifting of its position is taking place. Deviation from the symmetry points to air movement and advancing of a fire, for example. Such details are important for fighting the fire. It is clear from this example that certain signals (triggering operation, alarm) may be produced which are determined by the measured quantities (temperature rise). If a rapid temperature rise is specified as an alarm signal, the diurnal variation of the temperature, for example, would not lead to an alarm message (error message) as the temperature's diurnal variation follows a gentler curve than a fire.

Taken into account in the configuration is the fact that the physical characteristics (e.g. temperature change) depend on the type, structure (sensor without casing, sensor in a metal or plastic casing) and installation environment of the sensor. With these values specified in the configuration, all physical variables (heat conduction and/or heat insulation are particularly important) can be allowed for in a very detailed manner. If the configuration is changed, all associated physical variables are changed.

Represented in FIG. 3 is a thermal position profile (as base data for system analysis for thermal anomalies) in chronological sequence (at minute intervals) over a distance of 300 metres. It is evident that about 1,000 sec. after the beginning of the measurement a temperature rise occurs at three points of the section being measured. As already mentioned, with the aid of such time sequences or base data, thermal anomalies (intensity, extent, direction of expansion) may be recognised at any time by the system with reference to configured analysis parameters, the early stage of a fire being of particular importance.

Figure 4:
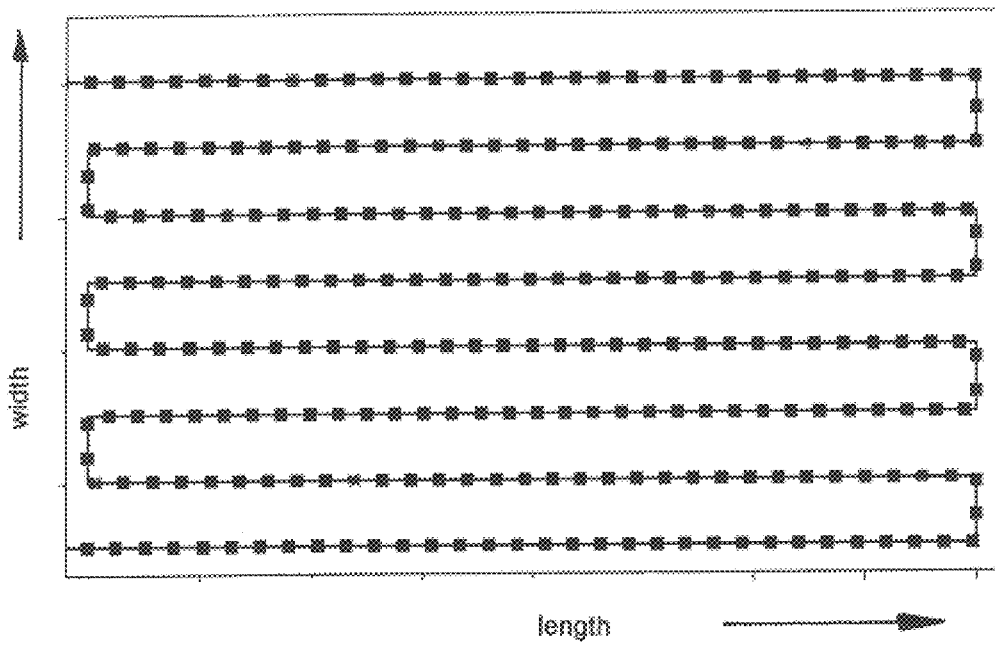
FIG. 4 shows a meander arrangement of a sensor.

A meander arrangement of a sensor is shown in FIG. 4. Such an arrangement could be installed in the bottom layer of a waste tip, for example. The associated two-dimensional temperature profile is shown in grey scale representation in FIG. 5. The combining of measured quantities of the linear sensor into a plane image is specified and set by the configuration. Measured quantities of locations on the sensor at varying distances apart are brought into proximity according to their geographical position. Depending on the structure of the waste tip, specific plane regions of the tip are subdivided into zones whose data are combined into data groups. Three-dimensional arrangements of a sensor (e.g. wrapping of a reactor vessel) can be converted in the same way into a plane image.

Figure 6:
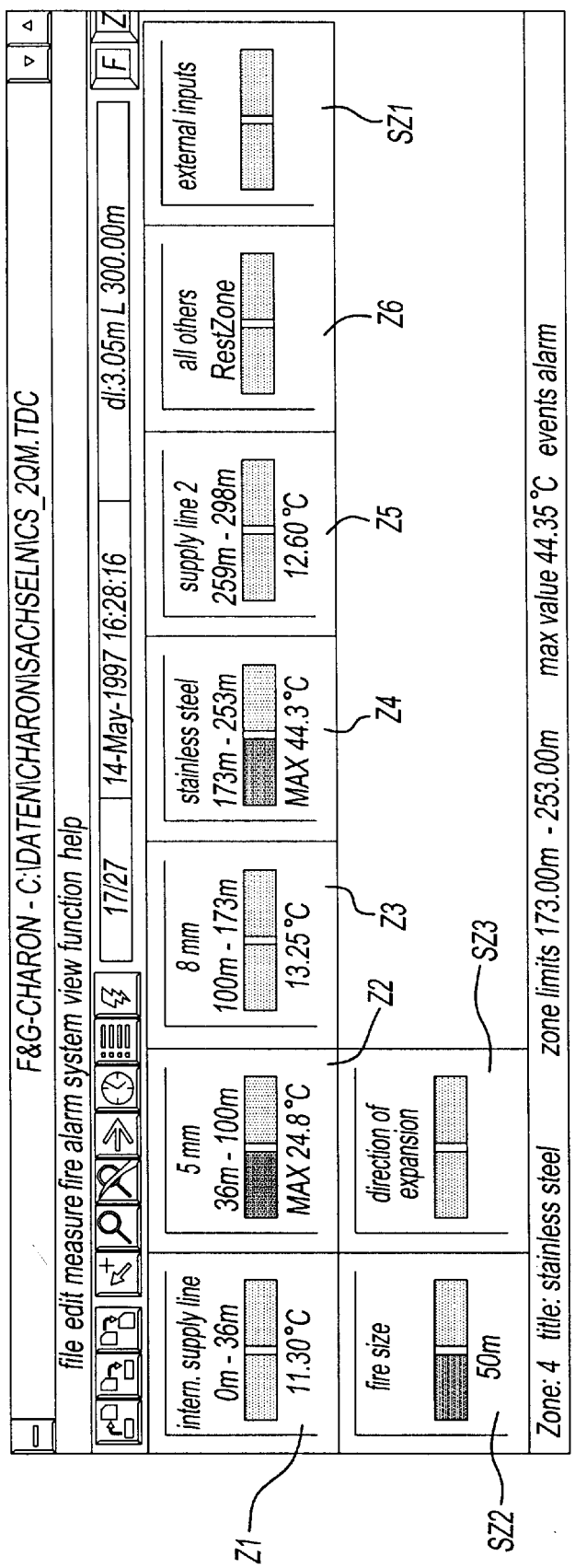
FIG. 6 shows zone visualization, and represented schematically in FIG. 7 is the event processing.

An example of a monitor visualisation of a section to be measured in a tunnel represented in zones is to be found in FIG. 6. Six set-up zones Z1 to Z6 are represented with information of their positional extent. In the fields Z1 to Z6 in the first line is a zone name or an indication of the physical structure of the sensor.

'5 mm' or '8 mm' mean that the sensor is in a plastic casing of a specific thickness. 'Stainless steel' means that the sensor is in a metal casing. The second lines of the fields reproduce lengths of the sensor sections. Indicated in the bottom line are the temperature average value in the normal thermal state and the maximum temperature of the zones in the alarm state. In addition, an alarm/malfunction is indicated by means of stylized indicator lights (shown as a black rectangle in Z2, Z4, SZ2). In a comment line KZ other details for each field may be represented or retrieved. Also, three special zones SZ1 to SZ3 are represented which are used for visualising additional information. In this example SZ2 represents the local extent of a fire in the tunnel calculated by the system from the measurement data.

Figure 7:
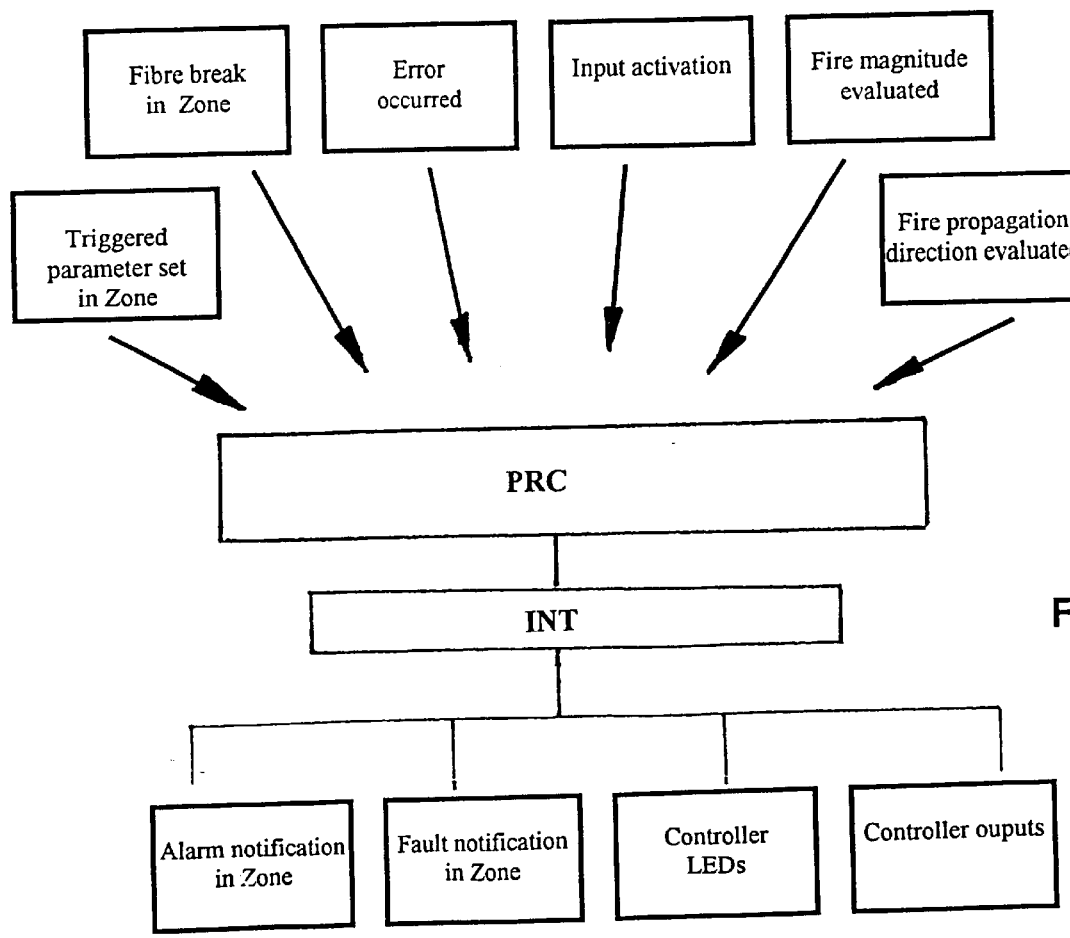

Represented schematically in FIG. 7 is the event processing. Depending on the event (top row), various messages are issued in the processing unit PRC via the interface INT, or address points, equipment or outputs are activated.

TABLE 1

Component parts of parameter sets of the configuration files
in the example of a fibre-optic temperature measurement 1. Parameter sets for the geometry and the sensor installation sensor installation geometry (linear, two-dimensional, spatial)
description of the geometry (plane, spatial)
approach lengths
position and addressing of the sensors in surface, space
calibration points, reference points, double layers,
positions of certain object parts
redundant structure (e.g. double fibre)

2. Measuring instrument-specific parameter sets sensor length
temperature accuracy (averaging calculation)
local resolution (averaging calculation)
averaging time
calibration
correction parameters
amplification factors
specific sensor parameters (e.g. optical group index of one or more fibres)

3. Organisation of data, programs, memories, reproduction media selection and control of programs involved
(visualisation, data transmission, data loggers)
references to files required
path indications
standard file names, standard titles, standard descriptions for the data files
measurement data memory management
window sizes and number of windows on the screen
signal data to be edited
event processing: assigning of events to address points 4. Data groupings linear, plane or spatial zone arrangements
zone or data group-specific tools, analysis methods, trigger sets
references to zone definitions 5. Editing and analysis methods and tools ranges of tools (includable arithmetical algorithms for pre-processing
the measurement data)
references to definition of the tools
parameters for tools
measurement value transformations to be performed
trigger sets: threshold value, gradients, deviations from standard,
specific standard trigger parameter sets
parameter sets for special analysis methods, and also references to
definition (e.g. in the case of heat alarms: size of fire, direction of fire or,
with reference to waste tip monitoring, for example: leakage-,
hot-spot detection)

6. Representation of the data (visualisation, hardcopy, printing)

application-specific representation parameters (linear representation,
measured quantity via location; plane representation according to the
sensor arrangement; three dimensional representation, objects detected)
representation spaces
colour palettes
event symbols TABLE 1-continued Component parts of parameter sets of the configuration files
in the example of a fibre-optic temperature measurement inscriptions
help lines, help symbols
selection and extent of the representation
operating options
coordinate systems
perspectives, views 7. Communication parameter sets and tools (data transmission)

protocol definitions
transmission band widths
communication connections
network addresses
specifying of type and extent of data exchanged

What is claimed is:

1. A method for configuring a measuring arrangement for monitoring a section covered by at least one sensor that supplies measured quantities including section information and physical data to the measuring arrangement, wherein the measuring arrangement is programmable to acquire, edit, save, represent and/or signal the measured quantities and includes a library including zone-specific data specific to one or more zones by which the section may be selectively defined in at least one configuration of the measuring arrangement, the library further including parameter sets selectable for programming at least one configuration of the measuring arrangement, and wherein the measuring arrangement is programmed to compile data groups on a zone-specific basis by assigning zone-specific data to the measured quantities, the method comprising the steps of:

transmitting at least a portion of the zone-specific data from the library to the measuring arrangement; and selectively transmitting, from the library to the measuring arrangement, at least one parameter set for editing at least one data group.

2. A method according to claim 1 wherein the at least one parameter set is zone-specifically defined.

3. A method according to claim 1 or 2 further comprising the step of selectively transmitting, from the library to the measuring arrangement, at least one parameter set for representing and/or communicating the measured quantities.

4. A method according to claim 1 or 2 further comprising the step of automatically transmitting a pre-saved parameter set to the measuring arrangement when a malfunction is signaled at an address point of the measuring arrangement or when no manual pre-selection of parameter sets is made on starting the measuring arrangement.

5. A method according to claim 4 further comprising the step of, when a malfunction is signaled at an address point of the measuring arrangement and/or when a mechanical change of a sensor is signaled, overwriting a parameter set used previously.

6. A method according to claim 4 further comprising the step of, when a malfunction is signaled at an address point of the measuring arrangement and/or when a mechanical change of a sensor is signaled, loading an additional parameter set.

7. A method according to claim 1 further comprising the step of transmitting, from the library to the measuring arrangement, at least one location profile of chronologically sequential measurements.

8. A method according to claim 1 further comprising the step of selecting a configuration of the measuring arrangement, said step performed on starting the measuring arrangement.

9. A method according to claim 8 wherein the step of selecting a configuration comprises selecting a zone configuration for the section.

10. A method according to claim 1 wherein the physical data comprise thermal data.

11. A configurable measuring arrangement for monitoring a section covered by at least one sensor supplying measured quantities including section information and physical data, the measuring arrangement comprising:

at least one module programmable for acquiring, editing, saving, representing and/or signaling the measured quantities; and a library comprising zone-specific data specific to zones by which the section is selectively definable for at least one configuration of the measuring arrangement and parameter sets for programming the at least one module according to at least one configuration selectable for the measuring arrangement, wherein the at least one module is programmed to compile zone-specific data groups by assigning at least a portion of the zone-specific data to the measured quantities.

12. An arrangement according to claim 11, wherein the parameter sets comprise parameters for at least one of acquiring, editing, saving, representing and communicating the measured quantities.

13. An arrangement according to claim 11 or 12 wherein the parameter sets comprise parameters which in the event of a malfunction may be transmitted to the measuring arrangement.

14. An arrangement according to claim 11 or 12 wherein the at least one sensor comprises a fibre-optic sensor, the measuring arrangement further comprising a reflectometric measuring system.

15. An arrangement according to claim 11 wherein the library further comprises at least one location profile of chronologically sequential measurements.

16. An arrangement according to claim 11 configurable to monitor at least one zone of the section, and wherein the at least one zone is selectable on starting the arrangement.

17. An arrangement according to claim 16 wherein the at least one module is further configured to edit the measured quantities for one zone differently from the measured quantities for another zone.

18. A method for configuring a programmable measuring arrangement for monitoring a section covered by at least one sensor that supplies measured quantities including section information and physical data to the measuring arrangement, the method comprising the steps of:

programming the measuring arrangement to group the measured quantities according to zones to be defined by parameter input to the measuring arrangement on starting the measuring arrangement; and on starting the measuring arrangement, selectively providing parameter input to the measuring arrangement to define the section as one or more zones and to configure the measuring arrangement for editing at least one group of the measured quantities.

19. A method according to claim 18 further comprising the step of, on starting the measuring arrangement, selectively providing parameter input to configure the measuring arrangement for editing at least one group of the measured quantities based on the zones defined for the section.

* * * * *